US008955854B2

(12) United States Patent
Taranto

(10) Patent No.: US 8,955,854 B2
(45) Date of Patent: Feb. 17, 2015

(54) CAR WASH CADDY

(76) Inventor: Gregory Taranto, Ringoes, NJ (US)

( * ) Notice: Subject to any disclaimer, the term of this patent is extended or adjusted under 35 U.S.C. 154(b) by 139 days.

(21) Appl. No.: 13/554,350

(22) Filed: Jul. 20, 2012

(65) Prior Publication Data

US 2013/0020776 A1 Jan. 24, 2013

Related U.S. Application Data

(60) Provisional application No. 61/509,760, filed on Jul. 20, 2011.

(51) Int. Cl.
*B62B 1/16* (2006.01)
*B62B 3/10* (2006.01)
*B62B 1/14* (2006.01)

(52) U.S. Cl.
CPC ...... *B62B 1/14* (2013.01); *B62B 3/10* (2013.01); *B62B 2202/023* (2013.01); *B62B 2202/028* (2013.01); *B62B 2202/50* (2013.01); *B62B 2501/02* (2013.01)
USPC ...................................... 280/47.35; 280/79.5

(58) Field of Classification Search
USPC ........ 280/47.131, 47.17, 47.19, 47.24, 47.26, 280/79.5
See application file for complete search history.

(56) References Cited

U.S. PATENT DOCUMENTS

| D182,716 | S | * | 5/1958 | Ferguson | D34/21 |
|---|---|---|---|---|---|
| 4,355,818 | A | * | 10/1982 | Watts | 280/654 |
| 5,159,777 | A | * | 11/1992 | Gonzalez | 43/54.1 |
| 5,203,815 | A | * | 4/1993 | Miller | 43/21.2 |
| 5,333,885 | A | * | 8/1994 | Pullman | 280/47.19 |
| 6,047,866 | A | * | 4/2000 | Brown | 222/608 |
| 6,109,628 | A | | 8/2000 | Scheper | |
| 6,220,610 | B1 | * | 4/2001 | Cox | 280/47.19 |
| 6,398,235 | B1 | * | 6/2002 | Cary | 280/47.26 |
| 6,487,814 | B1 | * | 12/2002 | Arredondo et al. | 43/54.1 |
| 6,830,253 | B1 | * | 12/2004 | Porras et al. | 280/47.26 |
| 6,860,494 | B1 | | 3/2005 | Chisholm | |
| 6,883,267 | B1 | * | 4/2005 | Pruitt | 43/54.1 |
| 6,962,354 | B1 | * | 11/2005 | Miller | 280/47.26 |
| 7,320,470 | B1 | * | 1/2008 | Butera | 280/47.18 |
| 7,467,801 | B1 | * | 12/2008 | Garduno | 280/47.26 |
| 2003/0000864 | A1 | * | 1/2003 | Carraro | 206/576 |
| 2003/0122331 | A1 | | 7/2003 | DiGiacomo, Jr. | |
| 2006/0070202 | A1 | | 4/2006 | Lauer et al. | |
| 2006/0163827 | A1 | | 7/2006 | Lauer et al. | |
| 2007/0045973 | A1 | * | 3/2007 | Grosso | 280/47.26 |
| 2007/0228680 | A1 | * | 10/2007 | Reppert et al. | 280/47.35 |
| 2007/0267832 | A1 | | 11/2007 | Denissov | |

* cited by examiner

*Primary Examiner* — J. Allen Shriver, II
*Assistant Examiner* — Bridget Avery
(74) *Attorney, Agent, or Firm* — Mark K. Young; Mayer & Williams PC

(57) ABSTRACT

A car wash caddy is implemented as a compact cart for storing, transporting, and keeping handy various supplies and equipment for use in a variety of applications. The car wash caddy includes a shelf that holds a wash bucket at a convenient hip-level height. A dry storage locker keeps supplies and equipment clean and dry and is slideably mounted beneath the wash bucket shelf. An elevated shelf includes cup holders and keeps supplies and equipment at hand for convenient access. Open topped storage bins are removably offset-mounted in the rear of the car wash caddy and are configured with vents to enable wet materials such as towels and sponges to drip and air dry. The car wash caddy includes two large rear-mounted wheels and two fixed legs A high-mounted handle gives the user leverage to easily maneuver the caddy to the job site and includes integrated water hose retaining slots.

19 Claims, 10 Drawing Sheets

CAR WASH CADDY

CROSS-REFERENCE TO RELATED APPLICATION

This application claims benefit of priority to U.S. Provisional Patent Application Ser. No. 61/509,760 filed Jul. 20, 2011 entitled "Car Wash Caddy" and is incorporated by reference herein in its entirety with the same effect as if set forth at length.

BACKGROUND

Storage is always an issue with any family. For car enthusiasts, there are virtually no portable storage systems that encompass the quantity and diversity of car care products and their specific storage and usage needs. Many people have shelves or cabinets to store their automotive car care products but neither of those items is portable, nor should they get wet. Accordingly, whenever a car care product is needed, it must be retrieved from the location, then placed on the ground (getting wet and/or dirty) and then placed back on the shelf/cabinet after use. Additionally, storage of some items such as sponges requires the ability for them to air dry without getting dirty. A conventional method for drying is to leave sponges in the bucket but this is often unsatisfactory as they do not dry quickly. And if the sponges are placed on top of an overturned bucket to dry, they can eventually blow off by the wind when dry.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A car wash caddy is implemented as a compact cart for storing, transporting, and keeping handy various supplies and equipment for use in a variety of applications such as car washing, gardening, home repair, and sports and recreation. The car wash caddy is sturdy, yet lightweight, and includes a shelf that holds a wash bucket at a convenient hip-level height. The shelf includes a lip around its perimeter to contain spills and keep items from sliding off. A raised feature may be provided to positively locate the bucket on the shelf and keep it from sliding or tipping over during use and when the caddy is moved. A dry storage locker with lid keeps supplies and equipment clean and dry and is slideably mounted beneath the wash bucket shelf. A lipped elevated shelf/work surface includes cup holders and keeps supplies and equipment at hand for convenient access. Open topped storage bins are removably offset-mounted in the rear of the car wash caddy and are configured with vents to enable wet materials such as towels and sponges to drip and air dry. The car wash caddy includes two large rear-mounted wheels and two fixed legs. A high-mounted handle gives the user leverage to easily maneuver the caddy to the job site and includes integrated water hose retaining slots. A hook, clip, clamp, holder, or other retainer may also be provided to store items such as long-handled tools, fishing rods, and the like.

In an alternative embodiment, the car wash caddy includes swivelably mounted wheels at the front legs to facilitate a user moving and steering the caddy using the handle in a similar manner to a shopping cart. The wheels may include locks to prevent swiveling and/or rolling to keep the caddy from moving, for example, when bumped or inadvertently pushed, or when used at jobsites having sloped or uneven ground.

Advantageously, by having multiple styles and types of storage areas, car care products such as cleaning, buffing, waxing, and detailing supplies can be conveniently stored in one place. The ability to have the sponges dry without getting dirt on them is a significant advantage provided by the car wash caddy since embedded dirt can scratch car finishes. Having the wash bucket at hip height on the shelf reduces lower back stress when washing a car since it virtually eliminates bending fully to ground level multiple times during a car wash session and permits the bucket to be stored on the shelf after use. Using the car wash caddy saves time as the elevated bucket height and provision of the hose at an easy grabbing height (instead of on the ground) quickens the wash time. The car wash caddy also keeps everything neat and organized which reduces the time needed to find a particular car care product and clean up when finished. The handle doubles as a towel holder/dryer and a hose holder. The two open storage units are configured to hold sponges, towels, and cleaning supplies and also enable spray bottles to be hung from the outer most edge of the basket to provide even more storage.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings. Unless otherwise indicated, elements are not drawn to scale.

DETAILED DESCRIPTION

Figure 1:
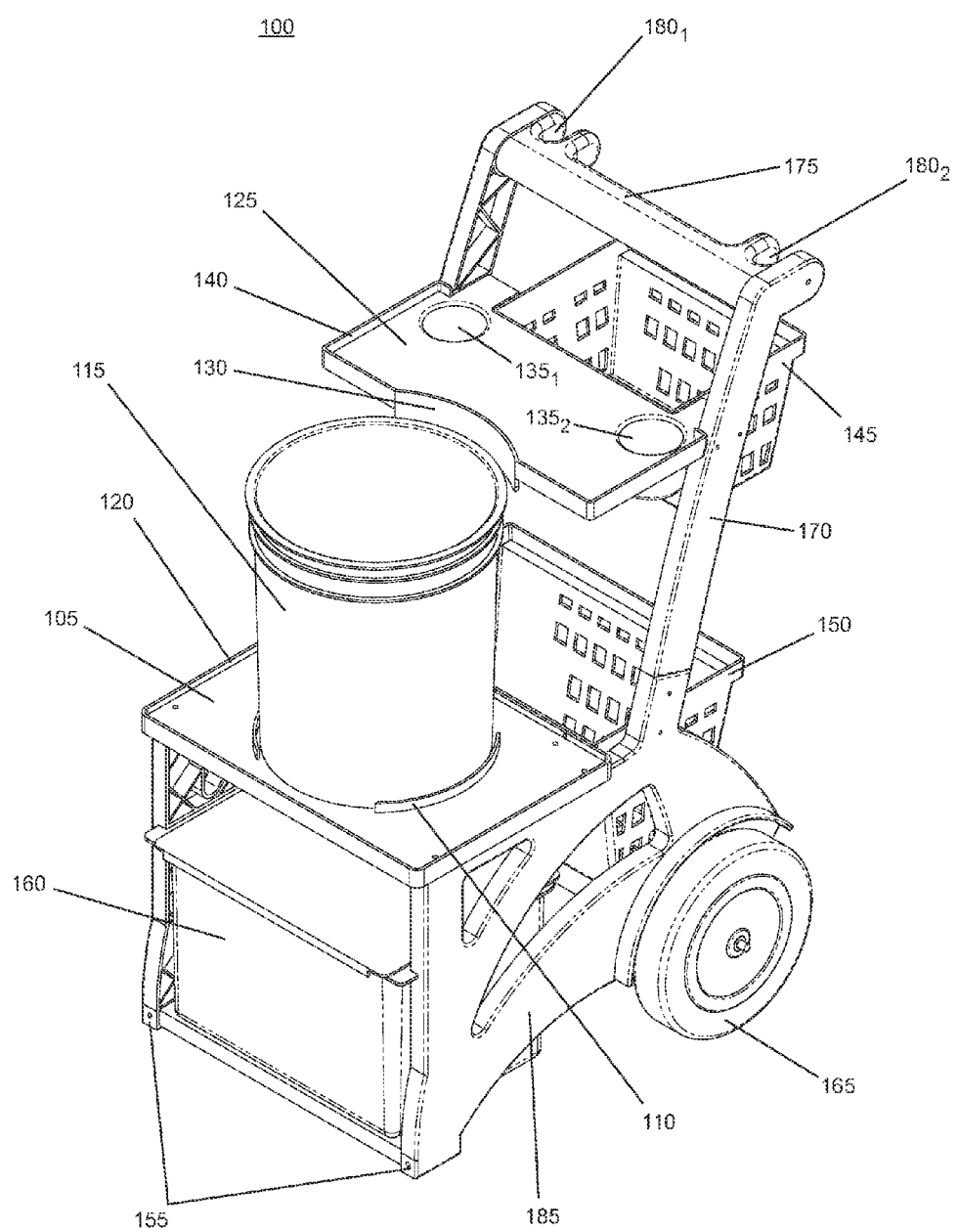
FIG. 1 is an isometric view of the front of the car wash caddy and the caddy's left side.
Figure 2:
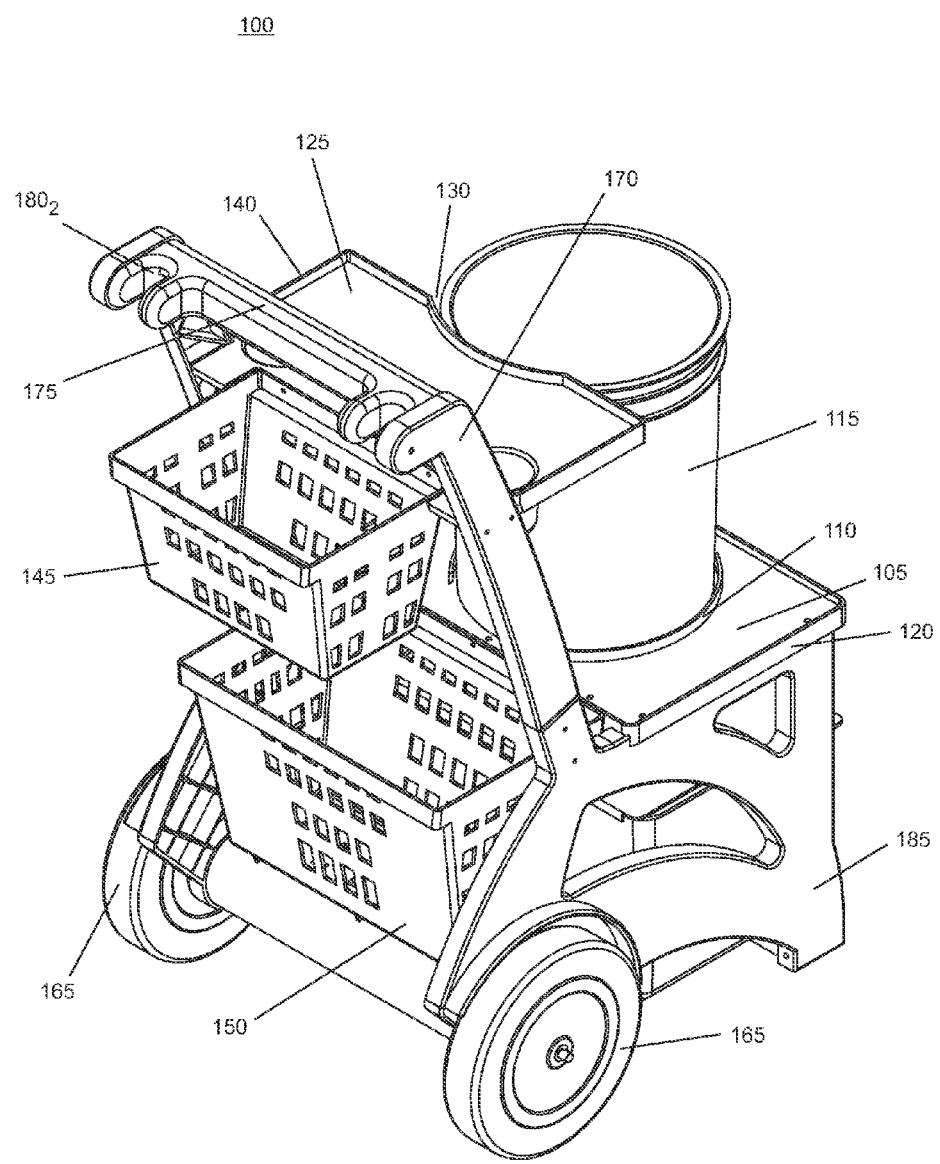
FIG. 2 is an isometric view of the rear of the car wash caddy and the caddy's right side.
Figure 3:
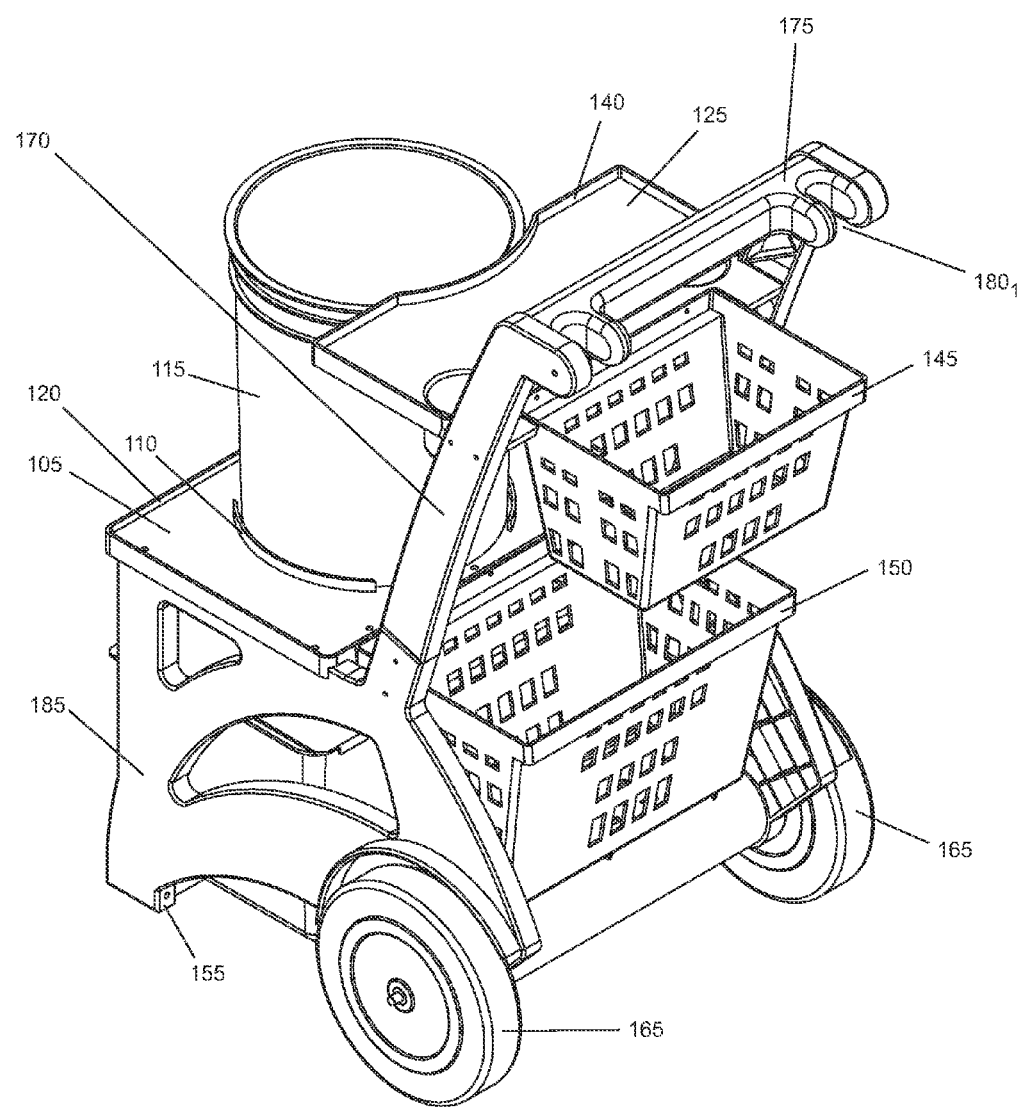
FIG. 3 is an isometric view of the rear of the car wash caddy and the caddy's left side.
Figure 4:
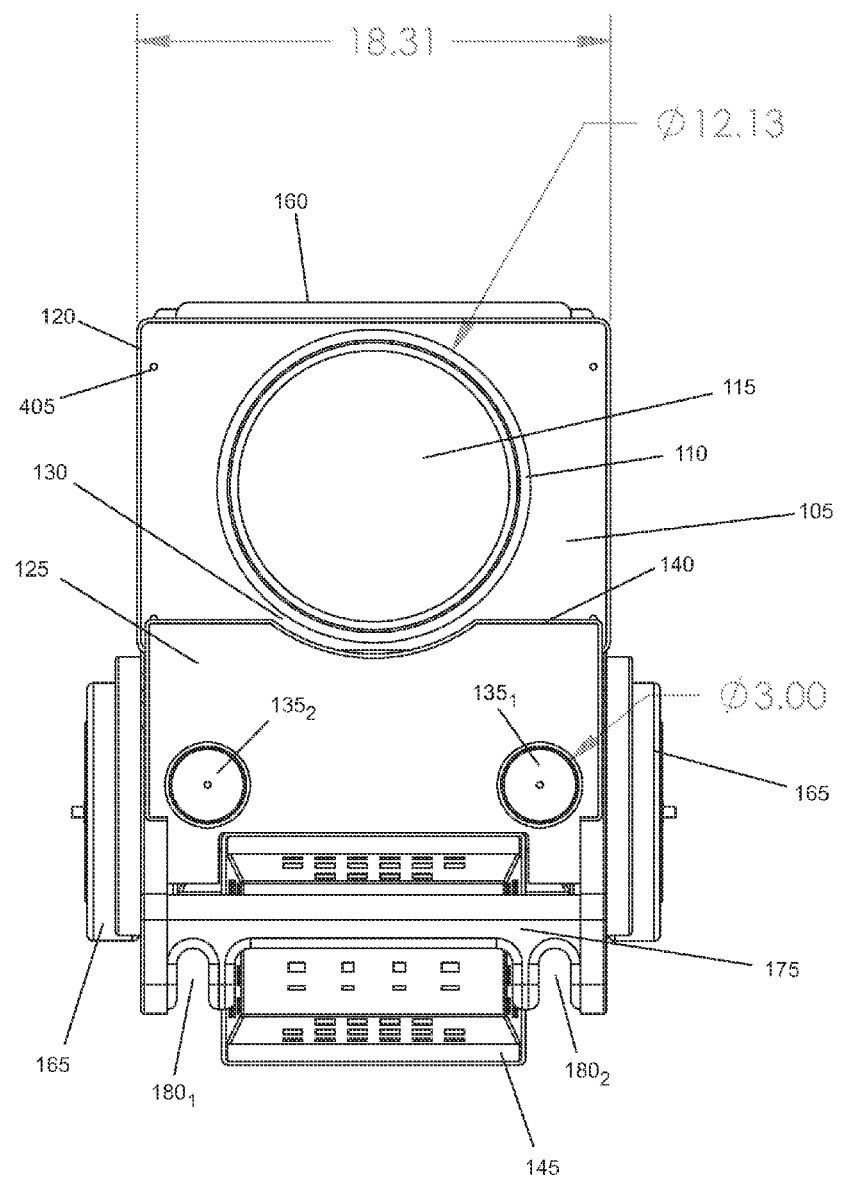
FIG. 4 is a top view of the car wash caddy with illustrative dimensions of an exemplary embodiment.
Figure 5:
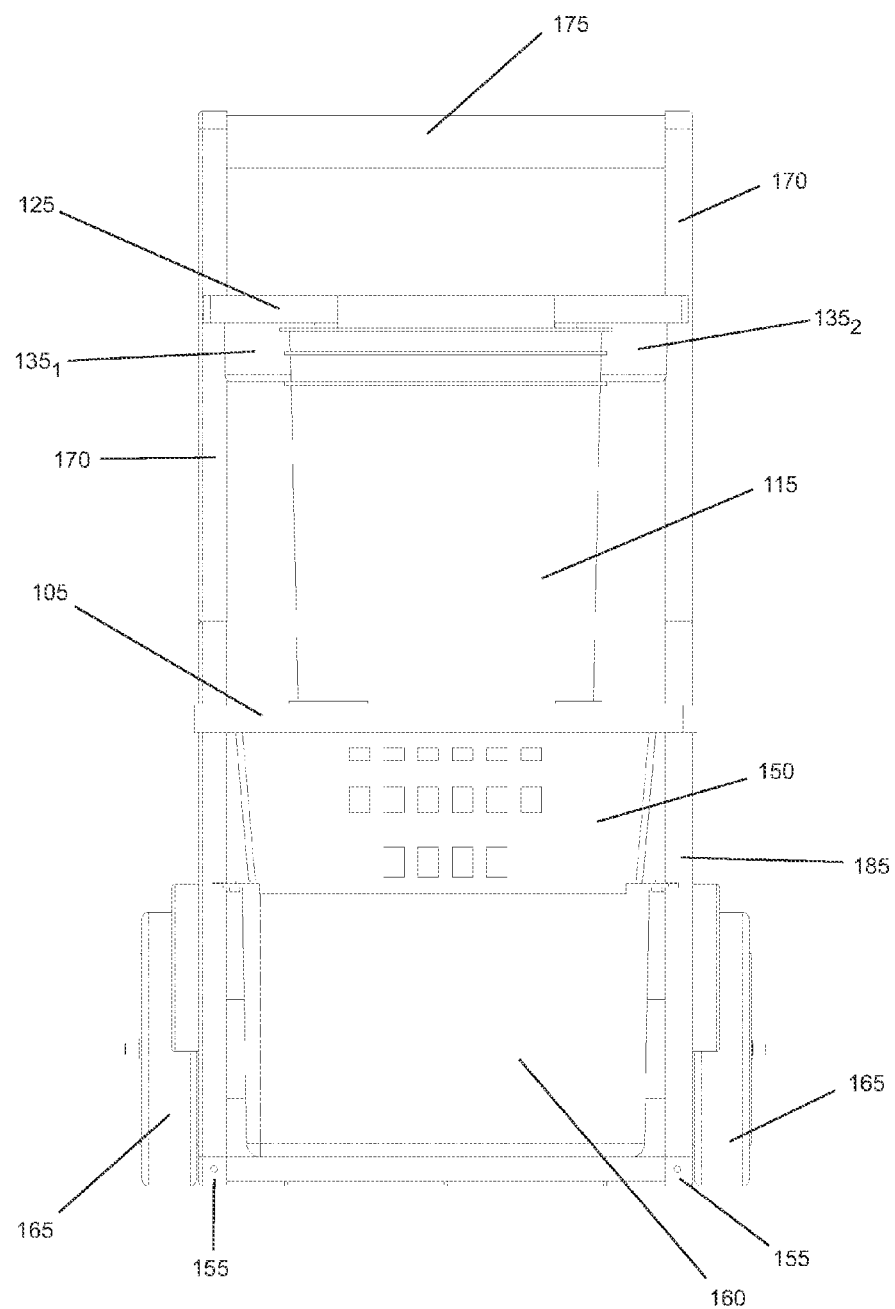
FIG. 5 is a front view of the car wash caddy.
Figure 6:
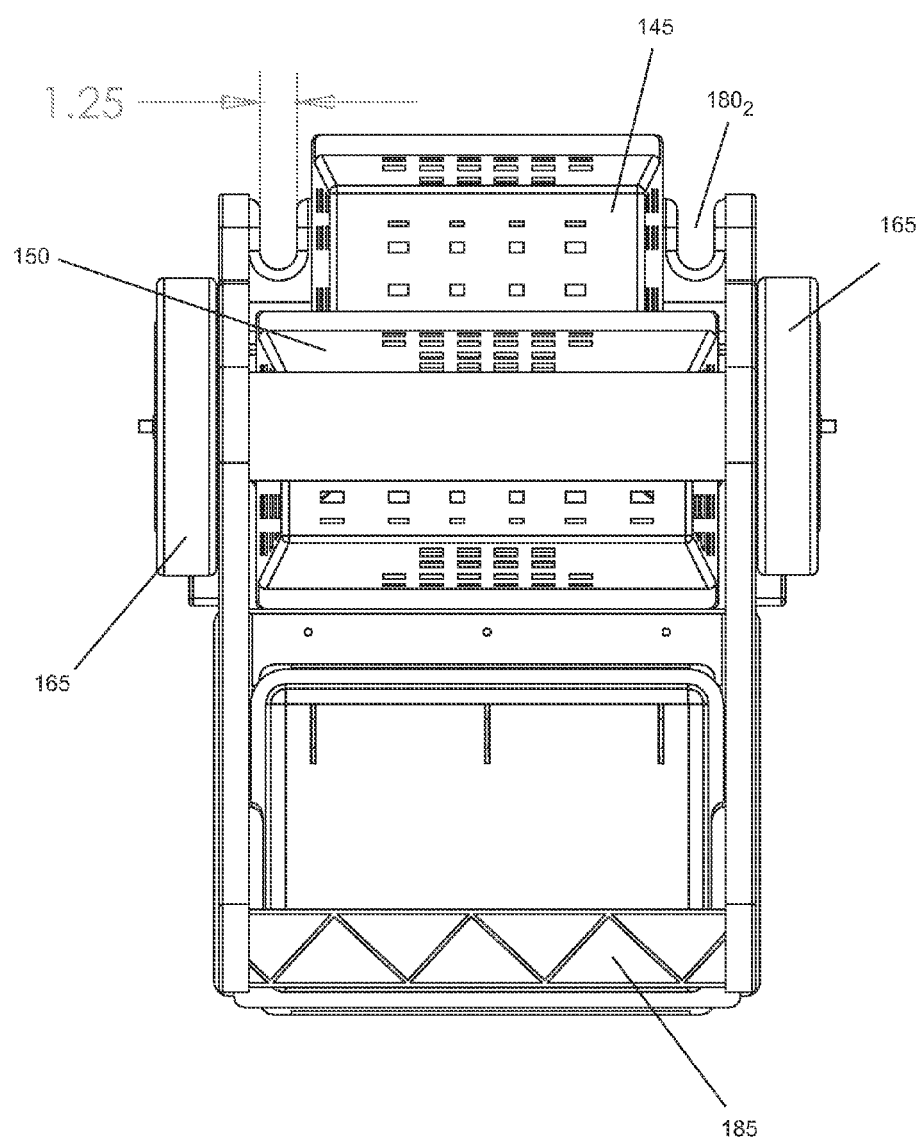
FIG. 6 is a bottom view of the car wash caddy with illustrative dimensions of an exemplary embodiment.
Figure 7:
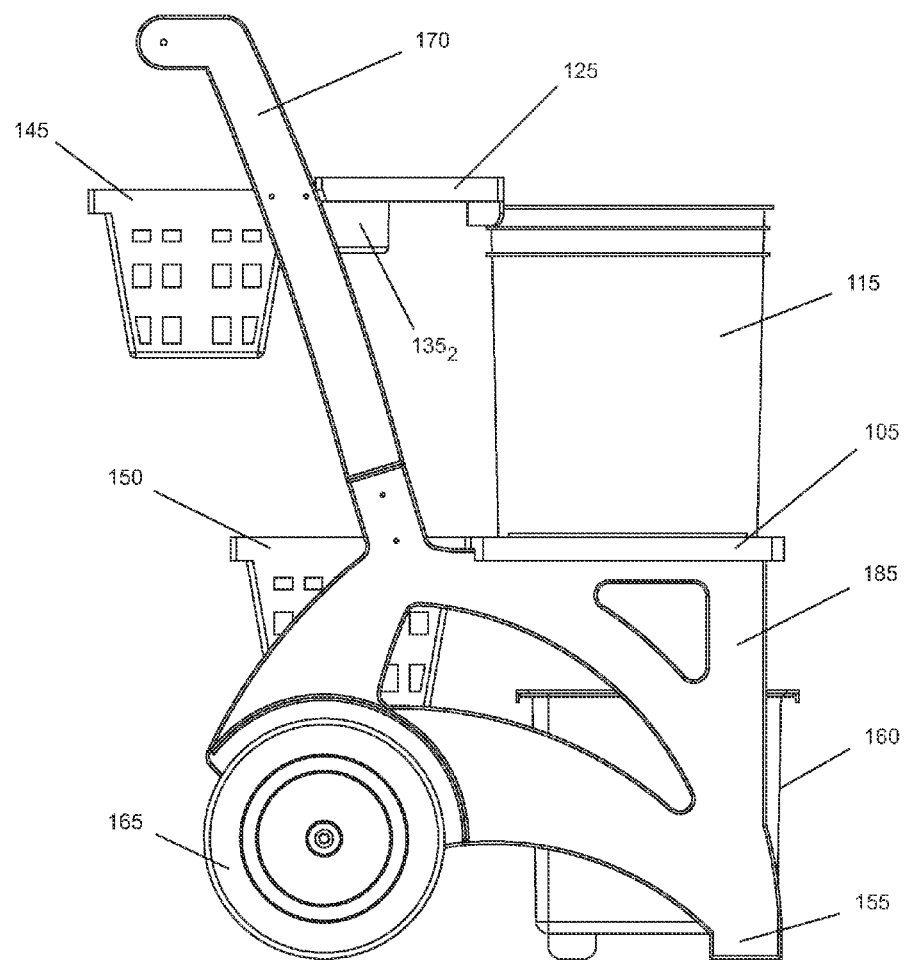
FIG. 7 is right side view of the car wash caddy.
Figure 8:
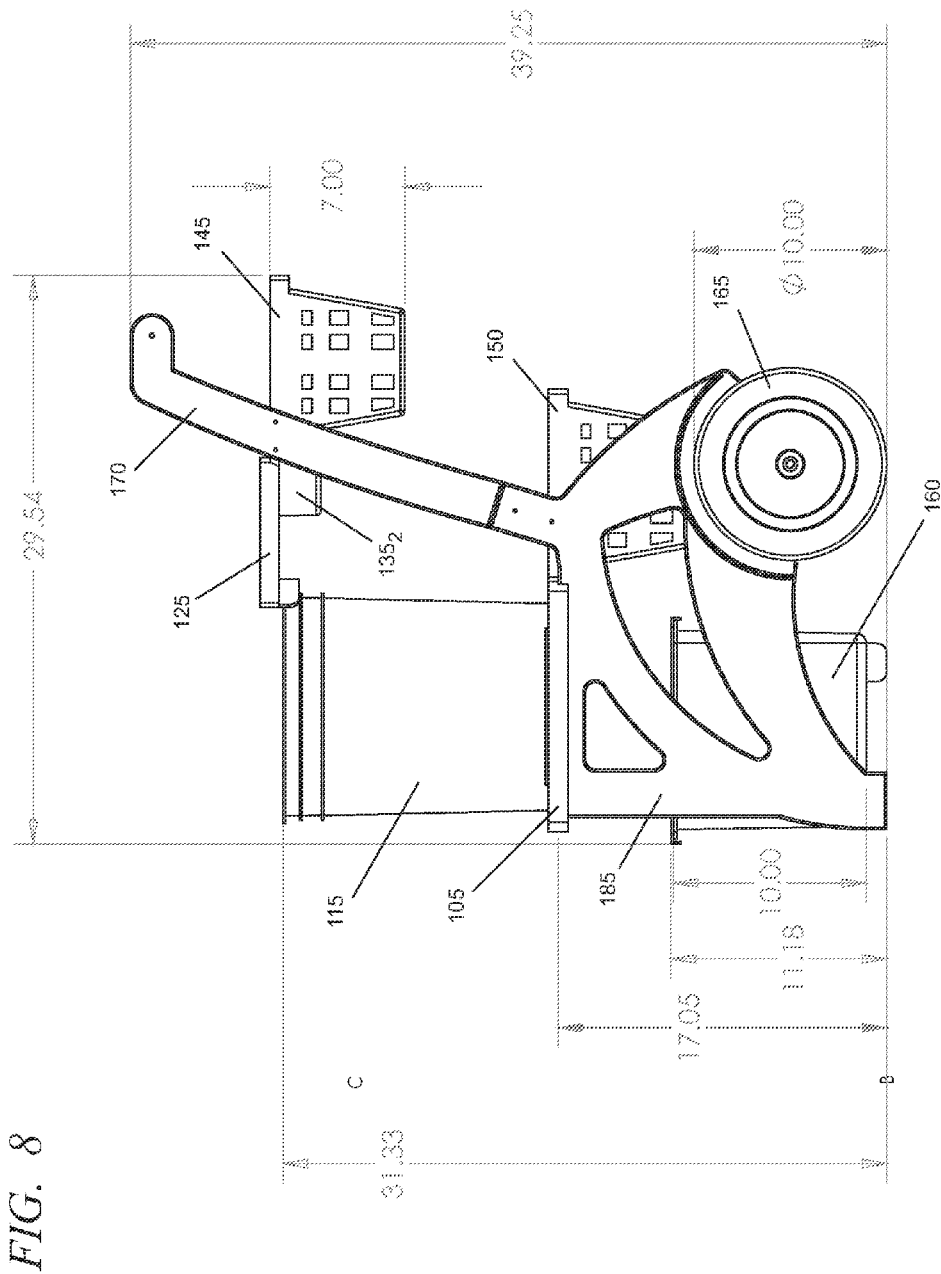
FIG. 8 is a left side view of the car wash caddy with illustrative dimensions of an exemplary embodiment.
Figure 9:
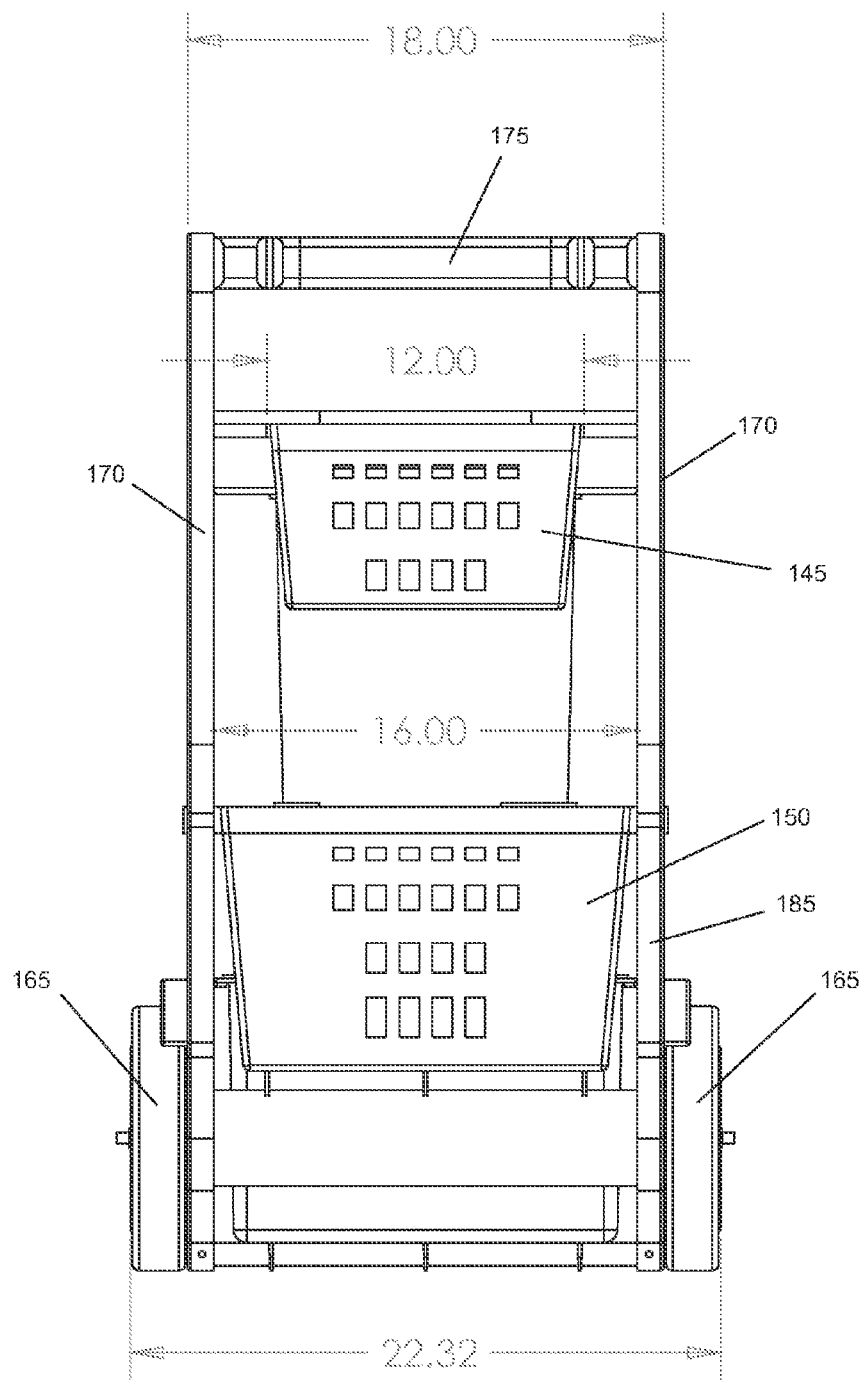
FIG. 9 is a rear view of the car wash caddy with illustrative dimensions of an exemplary embodiment.

The car wash caddy and its features and functionalities are shown in various views in the drawings. It is emphasized that the configuration and dimensions (in inches) shown in the drawing are solely intended to be illustrative and that variations from what are shown are still encompassed within the scope of the invention. The car wash caddy has many key features to enable it to conveniently function in a variety of roles in both home and business applications. Accordingly, while it is referred to herein as a car wash caddy, car washing is just one illustrative usage scenario for which the caddy may be advantageously applied.

Turning now to the drawings, FIGS. 1-9 show an illustrative car wash caddy 100 having two elevated shelves, as respectively indicated by reference numerals 105 and 125—one designed to hold almost any size bucket, and another that includes two cup holders and is configured to hold miscellaneous items and/or provide an elevated work surface. The lower shelf, termed the bucket shelf 105 herein, may be configured with a curved lip 110 or other raised feature around the perimeter of a wash bucket 115 to help keep the bucket from sliding back or tipping over when tilting the car wash caddy 100 up when moving. The bucket shelf 105 also has a raised lip 120 substantially all the way around the perimeter of the shelf to keep items from sliding off. One or more drain holes (representatively indicated by reference numeral 405 in FIG. 4) may be located in the bucket shelf 105 so that water can drain off.

The upper shelf 125, termed the drink holder shelf herein, has a curved recessed portion 130 along its front portion to accommodate the wash bucket 115 (e.g., a 5 gallon bucket) and features two cup holders $135_1$ and $135_2$. The upper shelf 125 can conveniently function as a raised work surface. The recessed portion of the drink holder shelf also supports a side of the wash bucket 115 to help keep it from tipping over when the car wash caddy is moved. The cup holders 135 are typically sized to be big enough to hold the "absorber" style towels (e.g., synthetic drying chamois) which are often stored in rolled up form. The drink holder shelf 125 also has a raised lip 140 around the front and sides to keep products from sliding off.

The car wash caddy 100, in this illustrative example, has two removable open storage bins (i.e., "baskets")—including an upper bin 145 that can contain car care products or sponges inside and provide a place to "hook" the handles of spray products on the outside. Spray products may also be hooked on the edge of the lower bin 150 in some cases as well. The storage bins 145 and 150 are offset mounted in a horizontal direction with respect to each other to keep wet items in the upper bin 145 from dripping directly on other items in the lower bin 150. The storage bins 145 and 150 may be perforated, as shown, in order to aid in air circulation to help dry wet items, as well as allow users to see the contents inside the bins.

In one embodiment, the car wash caddy 100 has two flat feet 155 in front and two wheels 165 at the back. The front feet 155 keep the car wash caddy from rolling without having the complexity of locking casters. The rear wheels 165 are typically configured to be large enough in diameter to permit easy rolling over small obstacles such as curbs, water hoses, or landscaping dividers. The rear wheels may be alternatively treaded, or non-treaded and may be pneumatic or solid (e.g., rubber, polyurethane, or other plastic).

The length between the front feet 155 and rear wheels 165 is relatively short to give maximal leverage through the handle to thus make the car wash caddy 100 readily maneuverable even when fully loaded with supplies. The car wash caddy's compact dimensions permit it to be placed parallel to the car against the garage wall without it interfering with walking space. The width of the car wash caddy is configured to be similar to typical garage shelving or tool cabinets. It can also be placed perpendicular to the car for easier roll in/out without interfering with the car's parking space.

The car wash caddy 100 may further include a lidded dry storage locker 160 that is located underneath the bucket shelf 105. The dry storage locker 160 is specifically designed to keep water and dirt out and may, in some implementations, use a tight fitting lid or otherwise include a gasket between the lid and the locker body so as to ensure the locker contents stay clean and dry. The dry storage locker 160 is attached, in this illustrative example, on pull-out rails in a similar manner to a freezer drawer. This feature helps keep the car wash caddy compact by storing the locker 160 under the bucket shelf 105 but permitting the user to pull it out to gain access to all items stored within. The dry storage locker 160 is typically configured to be tall enough to stack towels, waxes, and related supplies.

The car wash caddy 100 includes extended handle supports 170 which project upwardly and rearwardly from a base 185 which incorporates the front feet 155 and supports the axle for the rear wheels 165. The handle supports 170 are configured to so that a gripping portion of the handle 175 is horizontally located behind the longitudinal axis running between the center points of the rear wheels 165 to enable a user to apply leverage to lift the front feet 155 off the ground by pivoting the caddy about its rear wheels when wheeling the caddy to a desired location. The gripping portion of the handle 175 includes two slots $180_1$ and $180_2$ that are typically configured to accept a water hose to keep it readily at hand. The drink holder shelf 125 is mounted to the handle supports 170 as shown. The bucket shelf 105 is disposed on the base 185, as shown, and the base is further configured with the appropriate features or mechanisms to slideably engage with the dry storage locker 160.

An exemplary car washing usage scenario is now described: Begin by loading the car wash caddy 100 with car care products such as wheel, tire, window, leather, interior, paint, and trim cleaners. Sponges and towels, including the absorber style easily fit into the various storage areas described above. Next, pull the car wash caddy 100 out of the garage and fill the wash bucket 115 with soap and water. Rest an end of the water hose and nozzle in one of the slots 180 in the gripping portion of the handle 175. Clean the car and when done, the car can be dried and all items can be re-stored in and on the car wash caddy 100. Simply roll the car wash caddy 100 back into the garage. The wash bucket 115 can then be placed upside down on the lower bucket shelf 105 to dry and sponges can be placed in the one of the rear open bins to dry without getting dirty.

The car wash caddy 100 may accommodate almost any size bucket or paint can. This permits the car wash caddy to be alternatively used for other applications such as gardening, painting, and in sports and recreation such as fishing. Hooks, clips, holders, clamps, and other types of retaining devices (not shown) may be disposed along portions of the base 185, in various alternative embodiments, to facilitate storage of long items such as fishing rods and relatively lightweight long handled tools (e.g., hoes, rakes, etc.).

The car wash caddy 100 may be conventionally fabricated using metals and plastics. For example, high density polyethylene or polypropylene may be suitable for many of the main components of the car wash caddy. The rear wheels 165 may be implemented as rubber tires on plastic or metal rims that are incorporated into the car wash caddy 100 using, for example, a metal axle on metal bearings and/or plastic bushings.

Figure 10:
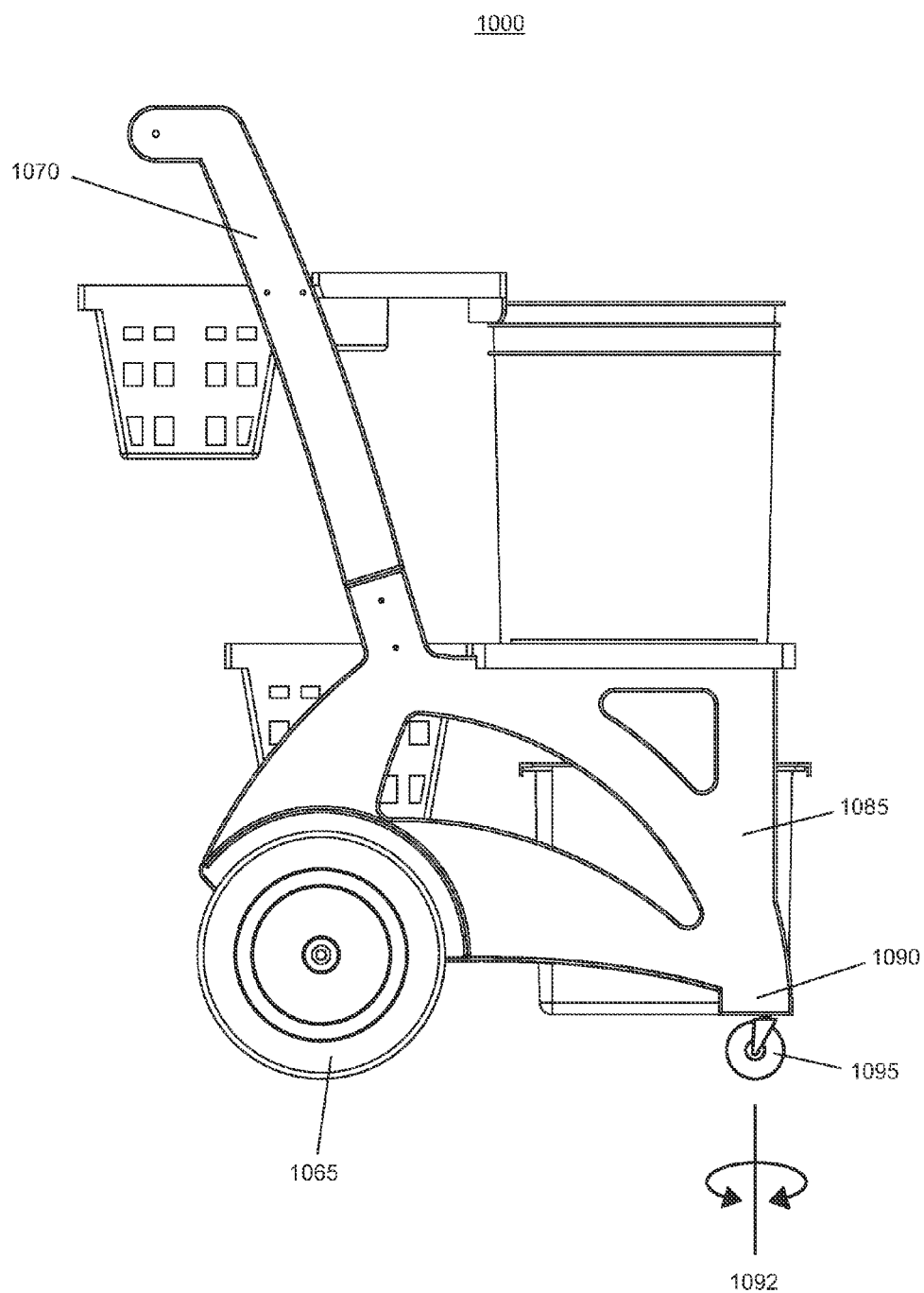
FIG. 10 shows an illustrative alternative embodiment of a car wash caddy having swivelably mounted wheels on the front legs to facilitate moving the caddy in a similar manner to a shopping cart.

FIG. 10 shows an illustrative alternative embodiment of a car wash caddy 1000 having a pair of swivelably mounted wheels 1095 on the front leg portions 1090 of the frame 1085 to facilitate a user to move and steer the caddy 1000 using the handle 1070 in a similar manner to a shopping cart. Each of the front wheels 1095 is able to swivel about a substantially vertical axis (as representatively indicated by reference numeral 1092). Typically, the swivel joint at the vertical axis is horizontally offset from the axle of the front wheel so that the wheels 1095 will automatically align to, and then rotate parallel to the direction of travel. Because the rear wheels 1065 are typically fixedly mounted (i.e., not swivelably mounted like the front wheels 1095), the car wash caddy 1000 does not have unconstrained motion in any direction. However, the user can easily maneuver the caddy 1000 by pushing or pulling the caddy at the handle 1070 so that the caddy pivots about the fixedly mounted rear wheels 1065.

In some implementations, the rear wheels 1065 can be configured to swivel while the front wheels 1095 are fixed, and in other implementations both the rear and front wheels can be swivelably mounted or fixedly mounted. Locking mechanisms (not shown in FIG. 10) may also be utilized to prevent a wheel from swiveling (when configured as a swivelably mounted wheel) or from rolling. Such locking mechanisms may be desirable to keep the car wash caddy 1000 from moving, for example, when bumped or inadvertently pushed, or when used at jobsites having sloped or uneven ground.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A manually propelled utility cart, comprising:
   a base including two front-located legs;
   a pair of wheels rearwardly mounted on the base;
   a slideably removable lidded dry storage locker configured for removal from a front portion of the base;
   a first elevated shelf, projecting from the base above the dry storage locker, that is adapted to hold a wash bucket, the first elevated shelf including a raised lip substantially around its perimeter and further including an interface for removably attaching a first storage bin;
   a pair of opposing upwardly, rearwardly projecting supports extending at their proximal ends from the base;
   a handle running between the supports at the distal ends of the supports, the handle including at least one recess for holding a water hose, the handle being located rearward to a longitudinal axis between respective center points of the rearward wheels so that a user may lift the front-located legs off the ground when propelling the utility cart by applying leverage to the handle so that the utility cart pivots about the axis on the rearward wheels; and
   a second elevated shelf mounted between the supports, below the handle and above the first elevated shelf, the second elevated shelf including at least one cup holder and having a raised lip substantially around its perimeter and further including an interface for removably attaching a second storage bin in which the first and second storage bins are mountable on the cart using a horizontal offset so that water draining from the second storage bin does not drip on to contents stored in the first storage bin, and further including a wash bucket receiving area for laterally supporting a rearward portion of a wall of the wash bucket when the utility cart is manually propelled.

2. The utility cart of claim 1 further including a pair of wheels disposed on respective ones of the two front located legs.

3. The utility cart of claim 1 in which the rear wheels are fixedly mounted and the pair of wheels disposed on respective ones of the two front located legs are swivelably mounted so that a user may move and steer the cart using the handle.

4. The utility cart of claim 1 in which the at least one cup holder is sized to store a rolled-up absorber-style drying cloth.

5. The utility cart of claim 1 in which the first or second storage bin includes openings to allow air flow around stored contents.

6. The utility cart of claim 1 further including a retainer feature for enabling removal attachment of a long handled tool or fishing rod to one of the handle supports.

7. The utility cart of claim 1 in which the first elevated shelf is configured to place the wash bucket at approximately hip level of a utility cart user.

8. The utility cart of claim 1 in which the base, supports, handle, and first and second elevated shelves are formed from injected molded plastic.

9. The utility cart of claim 1 further including a gasket disposed in the dry storage locker between a lid of the locker and a body of the locker.

10. The utility cart of claim 1 in which the first elevated shelf is configured with one or more water drains.

11. The utility cart of claim 1 in which the raised lip on the first elevated shelf has a substantially circular or partially circular configuration to interface with a round wash bucket.

12. The utility cart of claim 1 in which the wash bucket receiving area in the second elevated shelf is configured to be substantially semi-circular or partially semi-circular to interface with a round wash bucket.

13. The utility cart of claim 1 in which the rear wheels are configured as either pneumatic or non-pneumatic wheels, the non-pneumatic wheels comprising one of rubber or polyurethane.

14. The utility cart of claim 1 in which the rear wheels are relatively large in diameter so that they may roll over obstacles having relatively small diameters, the obstacles including a water hose.

15. The utility cart of claim 3 in which the front wheels are equipped with locks to substantially prevent swiveling or substantially prevent rolling.

16. The utility cart of claim 3 in which the rear wheels are swivelably mounted and the pair of wheels disposed on respective ones of the two front located legs are fixedly mounted so that a user may move and steer the cart using the handle.

17. The utility cart of claim 3 in which the rear wheels mounted on the base are swivelably mounted and the pair of wheels disposed on respective ones of the two front located legs are swivelably mounted so that a user may move and steer the cart using the handle.

18. The utility cart of claim 6 in which the retainer feature comprises one of hook, holder, clip, or clamp.

19. The utility cart of claim 13 in which the rear wheels are treaded.

\* \* \* \* \*